United States Patent [19]

Fitzgerald, Jr. et al.

[11] Patent Number: 4,899,691
[45] Date of Patent: Feb. 13, 1990

[54] PRECISION POSITIONING SYSTEM FOR A COATER

[75] Inventors: John W. Fitzgerald, Jr., Boxford; Donald Campbell, N. Andover, both of Mass.

[73] Assignee: Bolton-Emerson, Inc., Lawrence, Mass.

[21] Appl. No.: 323,185

[22] Filed: Mar. 13, 1989

Related U.S. Application Data

[63] Continuation of Ser. No. 71,415, Jul. 9, 1987.

[51] Int. Cl.$^4$ .............................................. B05C 11/00
[52] U.S. Cl. .................................. 118/665; 118/126; 118/410; 118/413
[58] Field of Search ................ 118/665, 410, 413, 126

[56] References Cited

U.S. PATENT DOCUMENTS 3,418,970 12/1968 Phelps et al. ................... 118/413 X
4,309,960 1/1982 Waldvogel ........................ 118/665
4,465,015 8/1984 Osta et al. ....................... 118/414 X

FOREIGN PATENT DOCUMENTS 0055867 7/1982 European Pat. Off. .

OTHER PUBLICATIONS

TAPPI Proceedings, 1987 Polymers, Laminations and Coatings Conference, pp. 193-203.

Blueprint, "Park-1-4395", Bolton-Emerson, S.A., (11/80).

*Primary Examiner*—Shrive Beck
*Assistant Examiner*—Alain Bashore
*Attorney, Agent, or Firm*—Wolf, Greenfield & Sacks

[57] ABSTRACT

A die, preferably one with internal metering pumps for applying an extremely uniform coating to a traveling web, is mounted over a pair of very rigid side plates. Horizontal surfaces of the plates support linear slides which in turn support the die through uprights. The slides have preloaded bearings to allow a linear movement of each upright with no lost motion. Pneumatic cylinders move each upright along its slide independently of the other upright. Adjustable stops set the die-to-web spacing when the cylinders draw the uprights, and therefore the die, toward the web. Other air/hydraulic cylinders drive the uprights away from the web, against the action of the main cylinders, to jump splices in the web. The system preferably includes an outrigger arm extending from each upright to a pair of auxiliary linear slides mounted on the side face of each side plate to relieve side loading on the main linear slides. In the preferred form, the stops are positioned and the actuators are controlled by a servo loop to provide, in combination with the independently movable uprights, continuous automatic control of the cross web coating dimensions in response to a coating thickness sensor. The servo system preferably also controls adjustment screws across the die to provide a continuous automatic control of the web coating profile.

17 Claims, 8 Drawing Sheets

PRECISION POSITIONING SYSTEM FOR A COATER

This application is a continuation of application No. 071,415, filed July 9, 1987.

BACKGROUND OF THE INVENTION

This invention relates in general to mechanical positioning systems. More specifically, it relates to a precision positioning system for a web coater which controls the coating profile across a one to fifteen foot web to within a tenth of a thousandth of an inch despite variation in the web thickness or other operating parameters.

For many applications it is necessary to apply a coating material to a wide, traveling web. A typical application is coating a thin layer of a hot melt adhesive onto a web of a paper, plastic or metal foil having a width of one to fifteen feet and a thickness of 4 mils, and with a variation in that thickness of ±5%. Ideally the coating thickness should be controlled to within tenths of a mil despite variations in the web thickness, its width, or the type of material being coated. Known coaters are not able to meet these requirements.

A first difficulty has been the die itself. It is very difficult to create a die which reliably and repeatably produces a coating of uniform thickness across the die, particularly when there are changes in the material being coated or the flow rate of coating material through the die.

The Park coater, described in U.S. Pat. No. 3,854,441, is an improvement over prior slot dies. It utilizes a fixed die and a movable backing roll that carries the web. This coater extrudes all of the coating material fed into it using a variable rate pump external to the die. There is no positive control of the coating thickness; the only control is the indirect one provided by an adjustment of the flow rate via an adjustment in the pump speed. Thus while Park coater is a significant improvement over earlier coating apparatus, it has not provided the aforementioned precision control over the coating thickness, nor has it proven to be useful for a wide range of coating materials. It has been useful with hot-melt materials, but less than optimal with water and solvent based materials.

A conventional extrusion die for coating is the "coat hanger" die which uses a contoured cavity precision ground into the die to distribute the material across the web. This type of die is costly to manufacture, is sensitive to the material being coated and the coating flow rate, and usually produces a heavier coating near the center of the web. More recently the assignee of the present application introduced a gear-in-die ("GID") coater which has a set of driven gears acting as a pump located within the die to meter the flow. This die has proven to be substantially insensitive to the material being coated and therefore it is an improvement over the Park coater and extrusion-type dies. However, the present positioning system for this GID coater has several significant drawbacks.

The GID coater has a pair of massive pivoting arms which support the die between them at an upper end and are pivotally mounted to a frame at the lower end. A torsion bar, and the die itself, couple the arms. The arms mount a motor and a chain drive for the gear pump in the die. This mounting system thus positions a die weighing approximately 1,000 to 1,200 pounds on the ends of two pivoted arms. Two large, main pneumatic cylinders are coupled to the arms to pivot the die toward and away from the web carried around a fixed backing roll.

This positioning system is characterized by less than optimal rigidity in the arms and a large angular momentum which resists rapid movement required to "jump" a splice, and in general has proven to be difficult to position and move with the desired precision. In particular, the force of an operator leaning on the die to make adjustments on the die has been sufficient to distort the die position and result in non-uniform coatings.

Various mechanical positioning systems are known from the machine tool arts, but the conventional slide and gib arrangement typically produces a positioning accurate to within only a mil. Using preloaded ball bearing and sophisticated lubrication systems, machine tools can overcome static friction and lost motion problems to approach the degree of positioning control envisioned for the present coater applications, but only with difficulty. Also, in machine tool design a movable platform is typically slide mounted on a pair of ways with the platform rigidly coupled between them. In other words, it is undesirable to have parallel slide paths where independent motion is possible along each path. In the coater art, this rigidity interferes with an accommodation to cross web thicknesses so that the coating is of uniform thickness even if the underlying web is not.

One special order coater has attempted to position a die with respect to a backing roll with the die mounted for linear, horizontal movement. The mount, however, involved a cumbersome mechanical linkage to move the die. The friction and lost motion problems allowed only a coarse positioning.

It is therefore a principal object of the present invention to provide a precision positioning system for a coater that controls the cross-web orientation of the die and its spacing from a backing roll, and a web carried on the backing roll, to within a tenth of a mil.

Another principal object of this invention is to provide a positioning system with the foregoing advantage which reliably positions and re-positions the die to a precisely known and adjustable position.

A further object of this invention is to provide a positioning system with the foregoing advantages that can also jump splices in the web.

Another significant advantage of the invention is to provide a system that is readily adapted to full servo control to provide fully automatic and continuous control of the cross-web coating profile.

Still another object is to provide a positioning system that applies a coating of closely-controlled, uniform thickness despite cross-web variations in the thickness of the web.

Another object is to provide a positioning system for a gear-in-die extrusion die where the gears are driven directly.

A still further object is to provide a positioning system with all of the foregoing advantages which has a favorable cost of manufacture as compared to comparable systems for GID coaters.

SUMMARY OF THE INVENTION

A die is mounted at its ends in a pair of upright supports mounted on linear slides that in turn are secured on very rigid side plates. The slides allow the die to move horizontally toward and away from a fixed backing roll, preferably also mounted between the side plates. A main actuator, preferably an air cylinder, is coupled to each upright and drives one end of the die through the associated upright along a horizontal, linear path determined by the slide. Each actuator and the associated die end mount operates independently. The uprights are each mounted so that they can pivot about a pin mounted on a carriage of each slide to accommodate this independence of movement of the two slides. The bearings of the linear slides are preloaded, and preferably adjustably preloaded, to avoid lost motion which would degrade the positioning of the die with respect to the backing roll with a repeatable precision within a tenth of a mil.

Adjustable stops associated with each upright set the web-to-die spacing when the main cylinders draw the die toward the backing roll. In a preferred form the stops are each formed by a fixed abutment secured on one of the side plates and a mating adjustable abutment in the form of a rod mounted in one of the uprights and threaded at one end to advance longitudinally when it is rotated, preferably by a stepper or servo motor acting through a reducing worm gear.

To reduce side loading on the linear slides carrying the uprights, each upright mounts an "outrigger" arm that extends downwardly along the side face of the side plate, terminating at an auxiliary linear slide oriented perpendicular to the main linear slide. To provide the capability to jump a splice in the web, a pair of high force, short travel actuators are coupled between the side plates and the uprights. These high force actuators act against the main cylinders as they draw the die against the fixed abutments to momentarily increase the web-to-die spacing to allow a splice to pass freely through the spacing.

Also in the preferred form the die has an internal gear pump and the cross-web profile of the coating is adjusted by a set of adjustment screws acting on a member which determines the outlet opening area of the die in the area of the adjustment. This die is driven directly, not through a chain drive or timing belt, by a motor mounted on one of the uprights. The die as a whole is pivotally mounted in the uprights with its orientation secured by a set of screws threaded into the uprights. With this arrangement, and with the pivotal mounting of the uprights on the slides, the degrees of freedom of movement of the die are separated to facilitate adjustments of the die position.

A coating thickness sensor scans across the moving, coated web to produce a signal indicative of the coating thickness across the web. This signal is an input to a microcomputer controller, along with other operating parameters such as web tension, splice detection, web speed, coating temperature, and coating material supply. The controller generates output control signals that operate the motors which set the two stops, control the coater adjustment screws, and operate the main and splice-jump actuators. This servo-control loop allows a continuous automatic operation of the coater while achieving a precisely controlled coating thickness, even where the web thickness varies.

These and other features and objects of the present invention will be more fully understood from the following detailed description which should be read in light of the accompanying drawings.

DETAILED DESCRIPTION OF THE PREFERRED EMBODIMENTS

Figure 1:
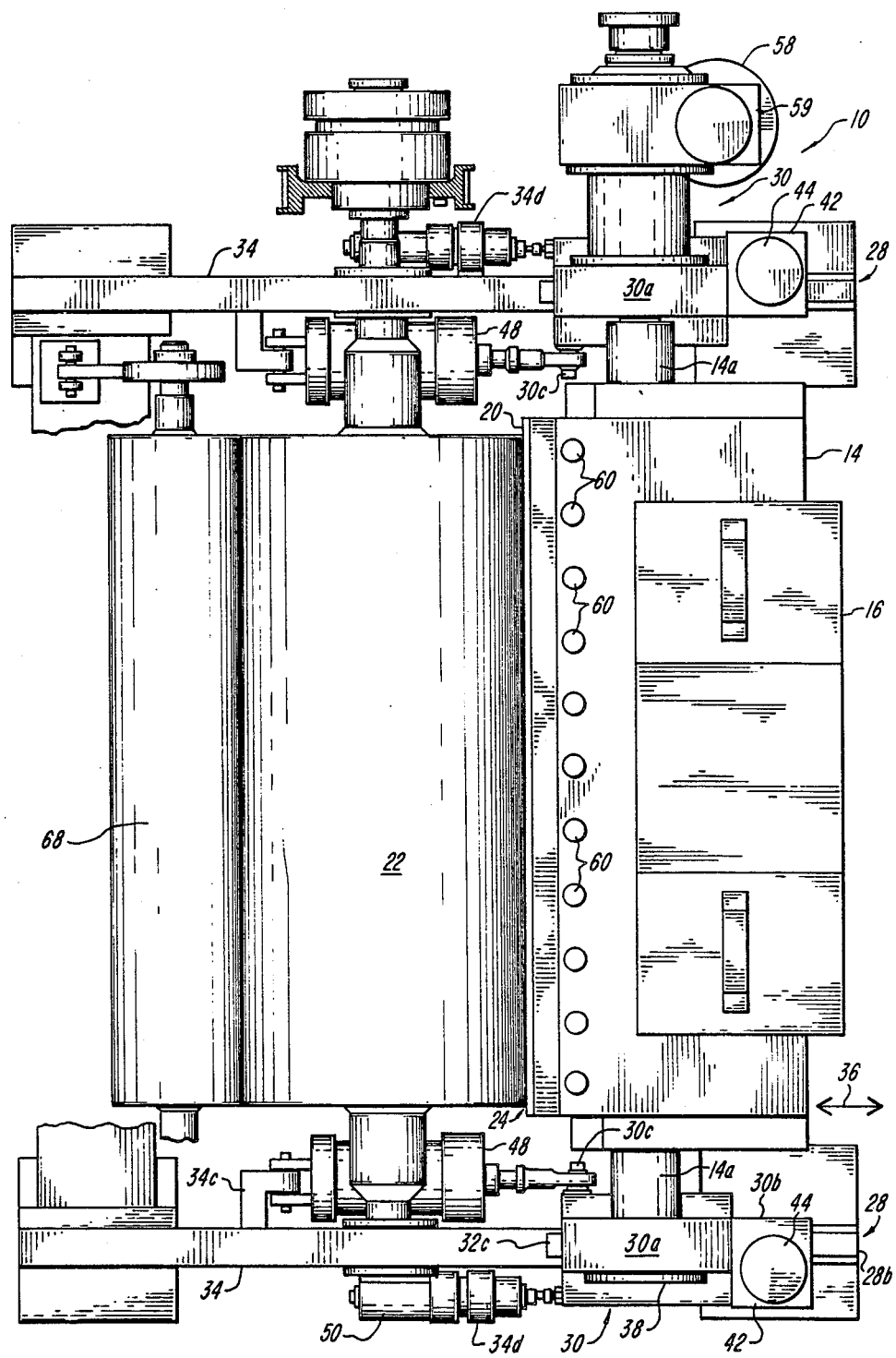
FIG. 1 is a top plan view of a coater utilizing a precision positioning system of the present invention to locate a GID die with respect to a fixed backing roll.
Figure 2:
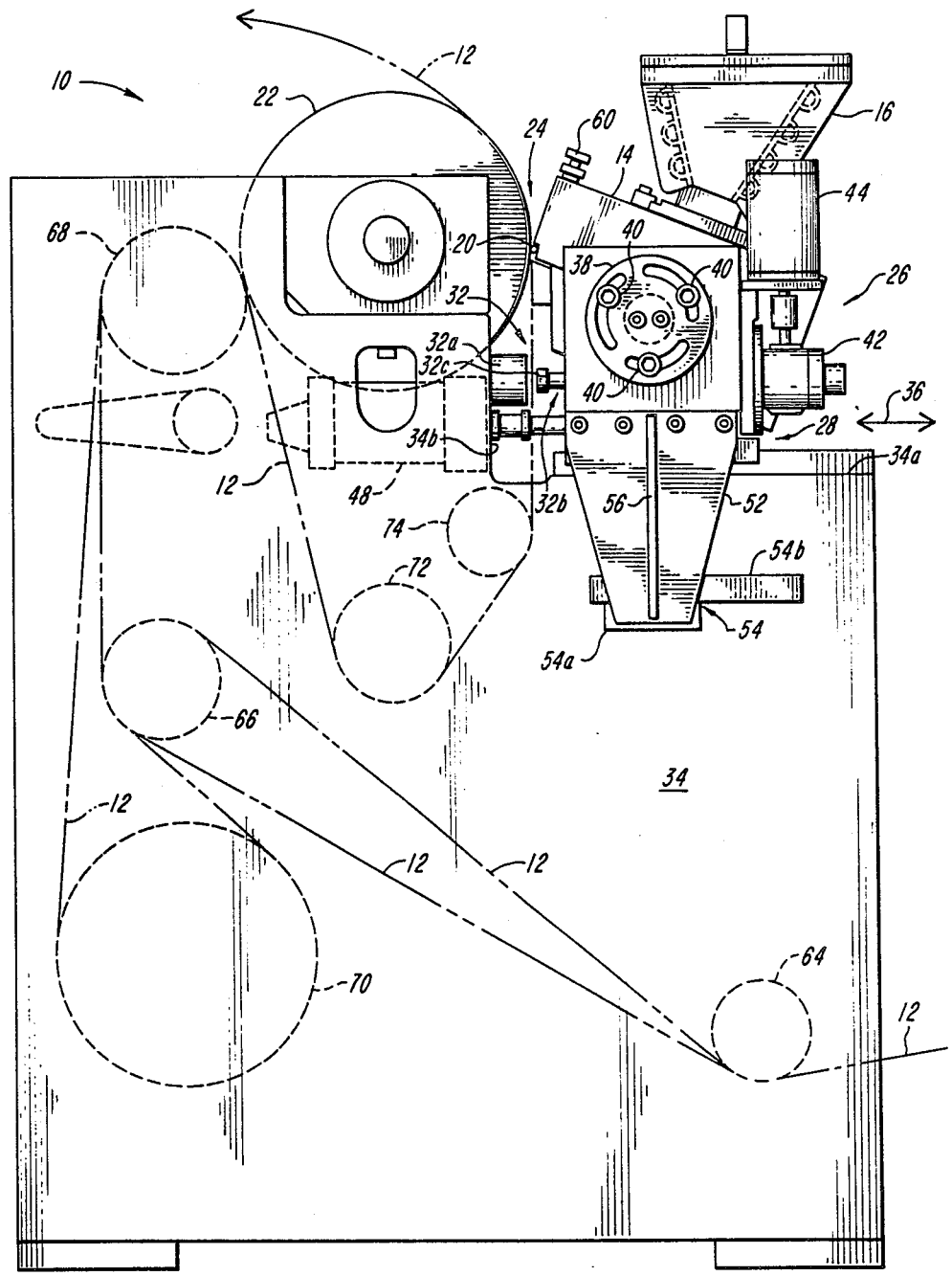
FIG. 2 is a view in side elevation of the coater shown in FIG. 1.

FIGS. 1-10 show a coater 10 that applies a thin layer of a coating material such as a hot melt adhesive to a moving web 12 of paper, plastic or metal foil. The web typically has a width of 2 to 15 feet and a thickness of 4 mils with variations in the thickness of ±5%. Thickness variations occur which are generally uniform across the web so that one side of the web is thicker than the other. The coater utilizes a die 14 which extrudes the coating material initially held in a supply hopper 16 through an internal supply channel, including a set of metering gear pumps internal to the die, to a lip rod 20 at the outlet of the die. The web wraps around a fixed backing roll 22. The spacing 24 between the web on the backing roll 22 and the lip 20 of the die determines the thickness of the coating applied to the web by the die (other factors such as web speed, coating feed rate, etc. being in the correct relationship).

A precision positioning system 26 which locates the die in an extremely well-defined and well-controlled spaced relationship with respect to the backing roll includes a pair of main linear slides 28, upright die supports 30 secured on the slides through a mounting plate 27, and an adjustable stop 32 that utilizes a fixed abutment 32a and a longitudinally adjustable abutment rod 32b. The linear slides are mounted on horizontal surfaces 34a of a pair of side frames 34 that are preferably formed from 1½ to 2 inch thick steel plate which has been machined, ground and stress relieved to be very rigid. Hereinafter the side frames will also be referred to as side plates. The linear slides are preferably linear roller ways with adjustably preloaded roller bearings 28c (FIG. 10) so that movement of the slide carriage 28a on the slide rail 28b is with no detectable lost motion despite the substantial static friction which is generated by the weight of the die and other assemblies supported by the slides. The slides are preferably those sold by IKO International, Inc. of Pine Brook, N.J. under their catalog No. 5716. Each rail 28b is bolted to the plate surface 34a and each upright 30a is secured to the mounting plate 27 by bolts 29 which in turn is secured to the carriages 28a. The bolts 29 capture belleville springs 29a under the head of each bolt. It is significant that each upright can pivot about a pin 29b which locates a low friction bushing 29c in a mating recess of the upright with substantially a zero clearance. Because the slides are linear and the surfaces 34a are horizontal, the uprights 30,30 and the die they mount move in a linear horizontal path toward and away from the backing roll as indicated by arrow 36. The pivot pin 29b and the resilient clamping force generated by the springs 29a allow the uprights to pivot to accommodate non-equal movements of the two slides and their uprights.

The die 14 has a main mounting shaft 14a which is pivotally mounted in the vertical plates 30a,30a of the uprights. A circular flange 38 with closed circular slots 38a is secured on the ends of the shaft 14a and abut the outer surface of the uprights. Bolts 40 located in the openings and threaded in the side plates provide a convenient arrangement for adjusting and then securing the angular relationship of the die 14 to the web 12. As shown in detail in FIGS. 7 and 8, this adjustment is made using a worm 41 which engages a semi-circular gear 43 secured to the shaft 14a by bolts 45 threaded in a semi-circular clamping piece 43a. The worm has a shaft 41a which is rotated to make the angular adjustment when the bolts 40 are loosened. This worm arrangement prevents the die from turning under its own weight when the bolts are loosened. It is also significant that this adjustment of angular position about this axis of the shaft 14a can be made independently of the adjustment of the die position along any other axis, due in part to the aforementioned pivot pin mounting of the uprights.

The fixed stop abutment 32a is secured on an edge 34b of each side plate 34. The adjustable stop is preferably a rod mounted in the upright plate 30a and having an abutment surface 32c at the end adjacent the fixed abutment 32a and a threaded portion 32d at its opposite end which couples with a worm gear reducer 42 driven by a stepping or servo motor 44 mounted on a plate 30b mounted on the upright 30a. The rod is supported in the upright plate 30a in a Thomson torque-resistant ball bushing bearing 46. Actuation of the motor 44 rotates the thread rod 32b which causes it to advance or withdraw from the fixed abutment 32a thereby adjusting the die-to-web spacing which is set when the abutment surfaces 32a and 32c contact one another.

A pair of main actuators 48,48 such as air, air/hydraulic, or hydraulic cylinders a mounting bracket 34c and a pin 30c secured to each die support 30. The main actuator draws the uprights and the die 14 mounted between the uprights toward the web until the abutments 32a and 32c engage to set the operating spacing 24 which determines the thickness of the coating being applied to the web (other parameters being in the correct relationship). The main actuator drives the die in the opposite direction to discontinue coating, for servicing, or between runs. A pair of smaller actuators 50,50, preferably air/hydraulic intensifiers with the hydraulics providing a 30:1 power increase, provide a high force, short travel drive mechanism which can momentarily push the die and its mount away from the web a small distance, against the drawing force of the main actuator, to allow the coater to "jump over" a splice in the web. The actuators 50,50 are each mounted on a bracket 34d secured to the full frame 34 and act on a stop on the vertical plate 30a of the upright.

To relieve side loading on the main linear slides 28,28, an "outrigger" plate 52 is secured to each upright assembly so that it extends downwardly along the side plate in a generally parallel spaced relationship. The lower end of the plate 52 is mounted on a carriage 54a of an auxiliary linear slide 54 which has its rail 54b mounted on the outer face of the ride plate 34 so that it is oriented perpendicular to the associated main slide 28. The plate 52 preferably has a stiffening flange 56. This auxiliary slide arrangement resists moments which would tend to cause the main slide to twist about its longitudinal axis and produce slide loading that can generate unacceptable levels of static friction in the main linear slide.

Figure 3:
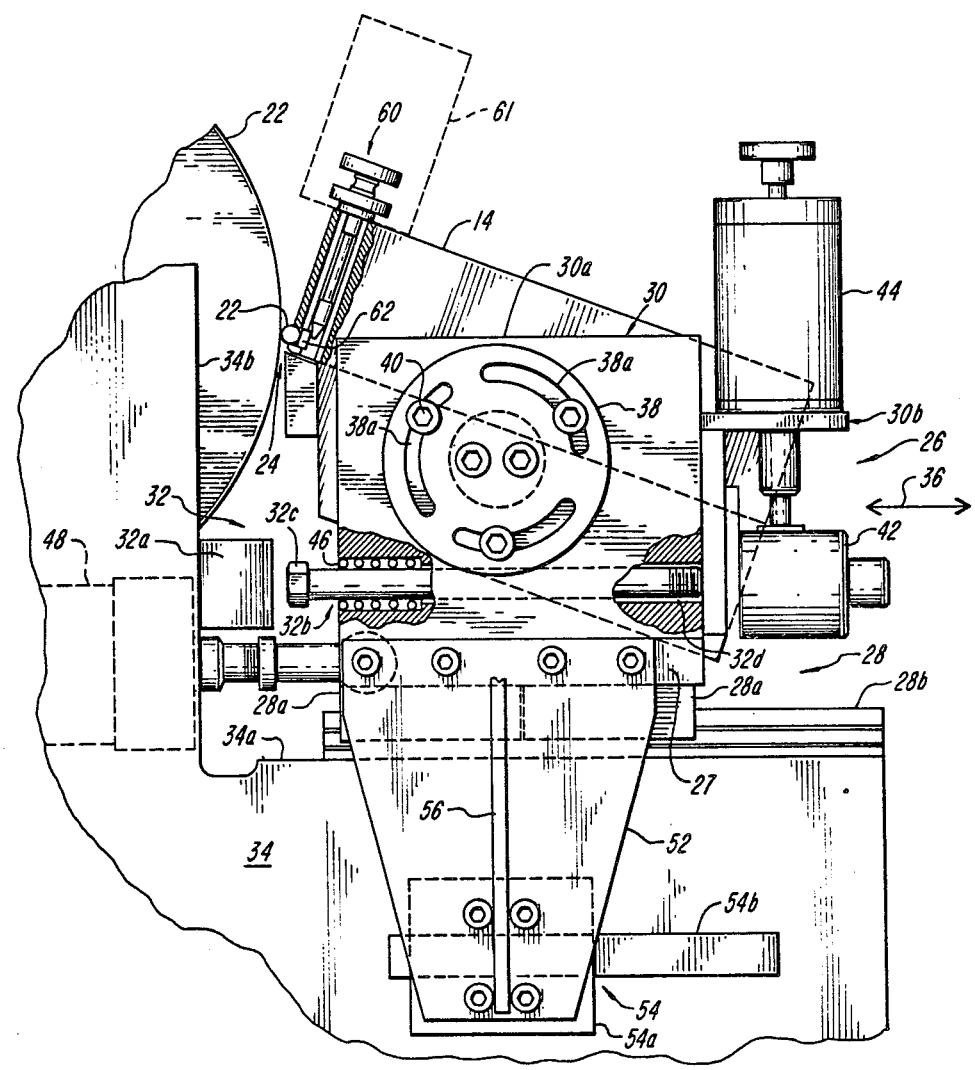
FIG. 3 is a detailed view in side elevation, with portions broken away and the die hopper omitted, of the position system according to the present invention.
Figure 4:
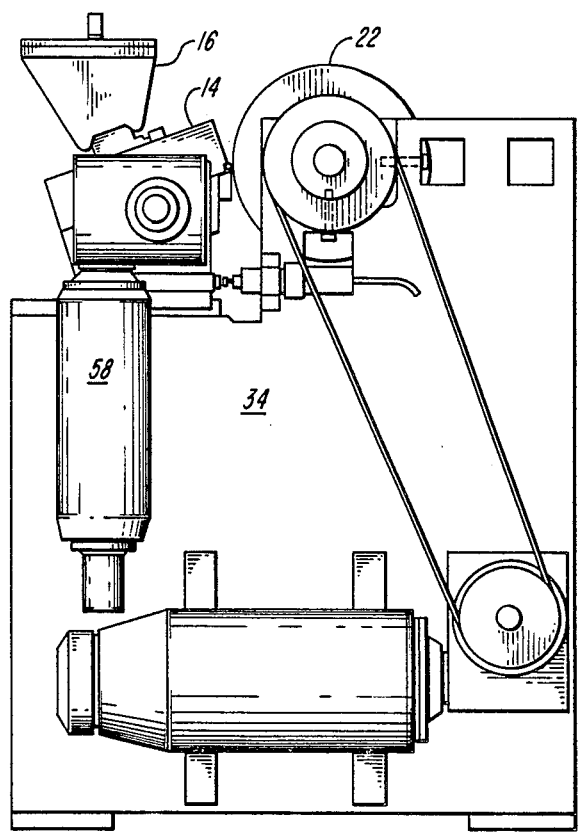
FIG. 4 is a view in side elevation opposite the view shown in FIG. 2.
Figure 10:
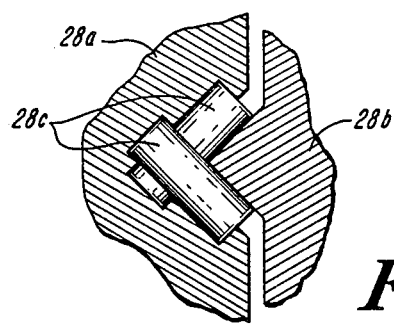
FIG. 10 is a detail view of the crossed roller bearings that support the carriage of the linear slide.
Figure 5:
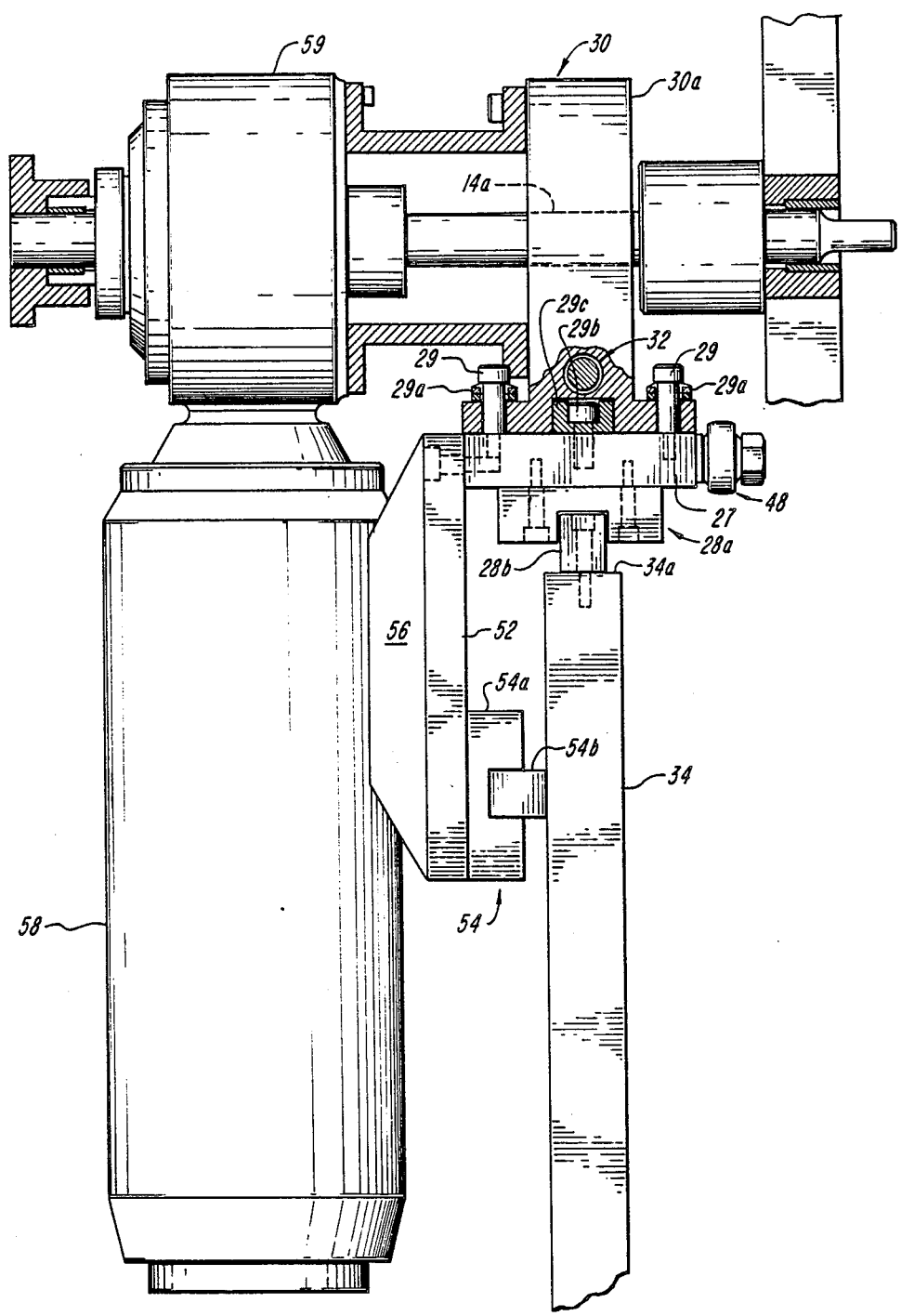
FIG. 5 is a detailed view in front elevation, and partially in vertical section, of the die mounting and gear drive assembly shown in FIG. 4.
Figure 6:
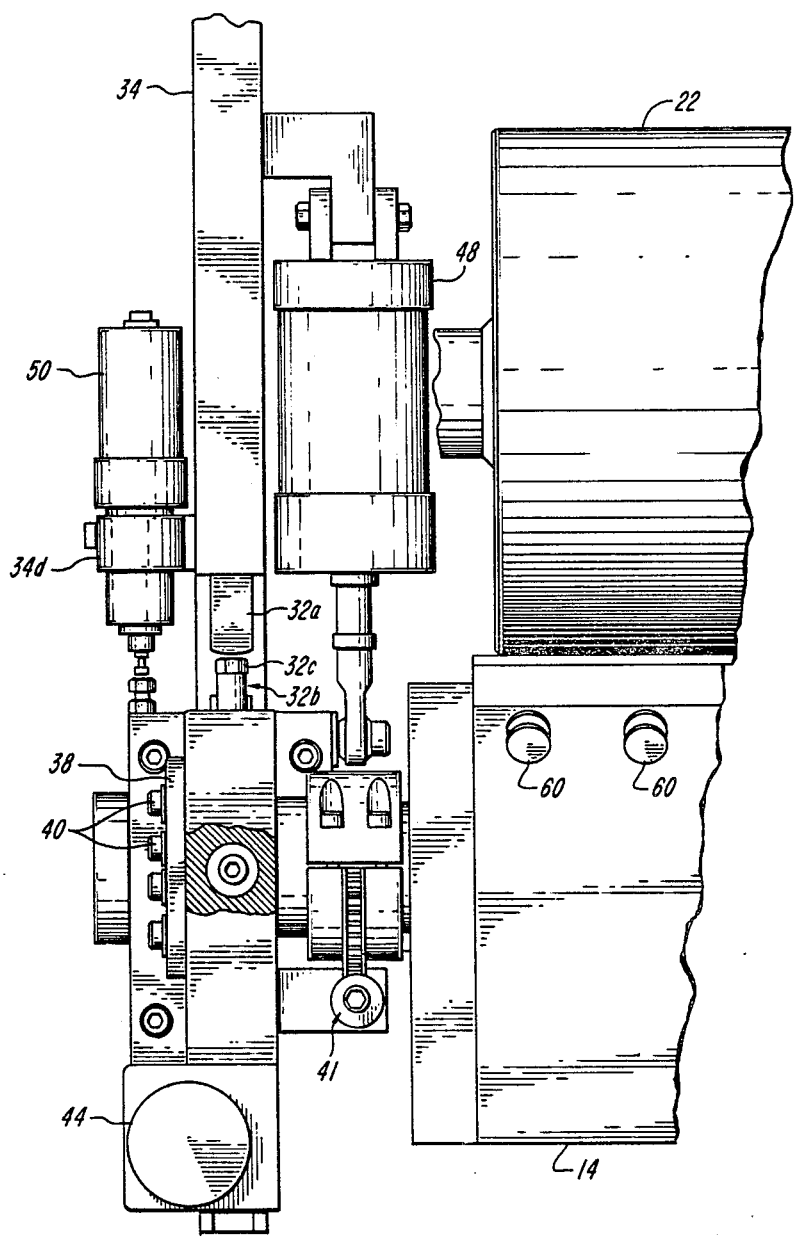
FIG. 6 is a detailed top plan view, with portions broken away, of the die mounting arrangement shown in FIGS. 2 and 3.
Figure 8:
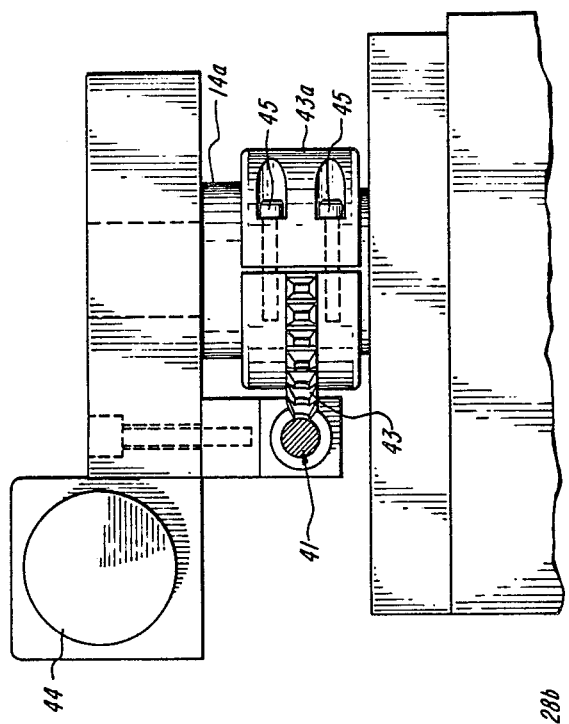
FIG. 8 is a top plan view corresponding to FIG. 7.
Figure 7:
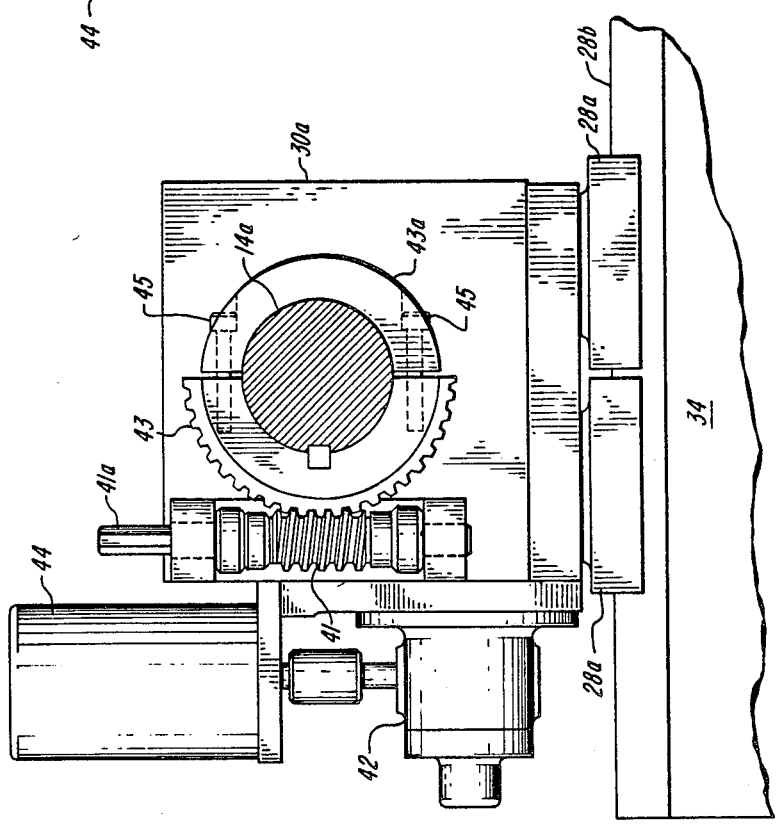
FIG. 7 is a view in side elevation of one slide and upright which shows a worm gear adjustment for the angular position of the die.
Figure 9:
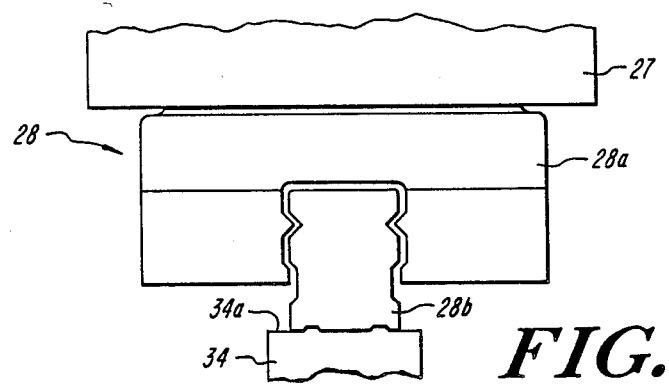
FIG. 9 is a detail view in vertical section of one of the linear slides shown in FIGS. 1-8.

As is best seen in FIG. 5, one die support 30 mounts a variable speed D.C. motor 58 which drives the gear pump of die 14 directly via a gear box 59—as opposed to chain drives of the prior art. The die 14, as is best seen in FIG. 1, has a set of adjustment screws 60 arrayed across its outlet at uniform intervals. These adjustment screws, as is best seen in FIG. 3, have a tapered cam surface at their tip which acts on a wedge 62 that can deform slightly in response to the screw setting to adjust the sized slot opening for the coating material in the region around any one of the adjusting screws. These screws 60 control the coating thickness profile across the web (for a given setting of the said upright die supports 30,30 along the direction 36). While the screws 60 are shown as being manually adjustable, they can be controlled by stepping or servo motors 61, as shown schematically in phantom in FIG. 3, to provide an automatic adjustment as will be described below given the precision of the positioning system of this invention.

Figure 11:
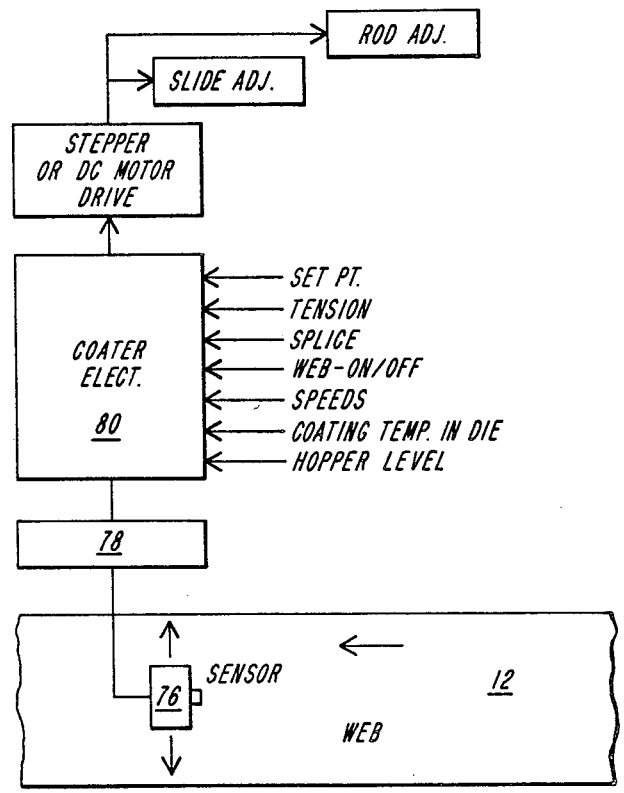
FIG. 11 is a schematic drawing showing a servo control system for automatic control of coater shown in FIGS. 1-10.

In operation an uncoated web 12 travels over rolls 64, 66 and 68, with an optional loop around a preheat roll 70. Rolls 64 and 66 are idlers and roll 68 is a nip roll which directs the web to a nip between itself and the backing roll 22. The web then passes around a tension sensing roll 72 and a bowed roll 74 before moving upwardly to the spacing 24 where the die 14 applies the coating. As shown in FIG. 11, a sensor 76 such as a conventional nuclear gauging device scans the coating thickness applied to the web and generates a signal indicative of the sensed thickness. This signal is processed by gauge electronics 78 and then applied as an input to a microcomputer controller 80 such as a μMAC-6000 sold by Analog Devices of Norwood, Mass. The controller 80 also monitors other relevant operating parameters such as the tension in the web, whether there is a splice in the web, whether a web is present, web speed, the temperature of the coating material in the die 14, the level of coating material held in the supply hopper 16 and a set point adjustment. In response to these inputs, the controller 80 produces output control signals, which will usually be amplified or act though relays or other conventional interface devices, to control mechanisms such as the motors 44,58, the main actuators 48,48 ("SLIDE ADJ" in FIG. 11) and the splice-jump actuators 50,50, and the servo motors 61 acting on the die lip rod 20 ("ROD ADJ" in FIG. 11).

While the system shown in FIG. 11 is the preferred arrangement to control the web-to-die spacing, it will be understood that other arrangements can be used. For example, the coater can be operated without a feedback loop and the web-to-die spacing can be measured with conventional mechanisms such as mechanical dial indicators or linear variable differential transformers (LVDT's).

It is significant that the mounts for both ends of the die 14 are independent of one another, having separate drive mechanisms, linear slides, and mounts. This allows the positioning system 26 to set the position of the ends of the dies independently to apply uniform coatings even when the web itself has a cross-web variation in its thickness. (The plates 52 and auxiliary linear slides 54, as Well as the main linear slides themselves, assist to resist side loading when the die is in such a skewed orientation with respect to the web.) It is also significant that the positioning system moves only in a horizontal plane over two main linear slides with direct linear drive mechanisms. This arrangement avoids the significant rigidity and angular momentum problems inherent in the predecessor design.

There has been described a positioning system which can reliably position and re-position, a die in a closely spaced relationship with respect to a fixed backing roll and a web carried by that roll with a high degree of precision, typically to within one ten-thousandth of an inch. The precision positioning system of the present invention also provides adjustment in the cross-web orientation of the die, has a splice-jump capability, is rigid, provides a self-contained drive for a gear pump in the die, and readily adapts to servo control in response to a down-stream sensed coating thickness to continuously and automatically vary operating parameters such as the position of the die with respect to the web, the cross-web coating thickness profile, and the operating speeds of the web transport and gear pump systems to yield a coating characterized by a uniformity that has heretofore been unattainable in a commercial coater, particularly a coater that can apply coatings of a wide range of materials. The present invention not only positions the die precisely, but it does so with a decrease in the amount of drive force required. The drive system is therefore smaller and less costly. The compactness and design simplifications of the present invention also provide additional competitive costs of manufacturing advantages.

While the invention has been described with respect to its preferred embodiments, it will be understood that various alterations and modifications will occur to those skilled in the art. The adjustable stop can be provided in a variety of alternative ways such as a fixed stop abutment secured on each upright striking a wedge-shaped abutment member that is mounted on a side frame and is movable vertically to vary the web-to-die spacing. Also, while the invention has been described with reference to cylinders which draw the die against adjustable stops, it is possible to use precision ground lead screws (single or twin) driven by appropriate motors, acting in cooperation with known encoding devices to provide a measure of the position of the die. One disadvantage of this arrangement is that it does not readily provide a splice-jump capability. Further, while the linear slides have been described as mounted on horizontal surfaces of a pair of side plates, the horizontal surfaces do not necessarily need to be formed on the side plates. Therefore in this application horizontal mounting surfaces on the side plates should be interpreted as including equivalent surfaces formed on other members or member. Still further, while the invention has been described with reference to the application of a thin, well-controlled coating to a web, it may also be used in a laminating application where two or more webs are secured together with a thin adhesive coating, or it may be used to produce thin film materials using the equipment described herein to extrude the film onto the backing roll and then remove and process it using standard techniques. These and other variations and modifications are intended to fall within the scope of the appended claims.

What is claimed is:

1. Precision positioning means that repeatably locates and adjustably aligns a die with respect to a backing roll, comprising, a die of rigid side plates having a generally vertical orientation and located at the ends of said die, each of said side plate having a horizontal mounting surface, linear slides secured on said mounting surfaces, said slides being preloaded so that they move along a first direction with substantially no lost motion, means for mounting said die at its ends, said mounting means being in turn mounted on said linear slides to allow movement of both sides of said die independently of one another, and means operatively coupled to said mounting means to drive said mounting means and said die mounted thereon along said first direction on said linear slides, and means operating in cooperation with said drive means for controlling the position of said die with respect to said backing roll.

2. The precision positioning system of claim 1 wherein said position controlling means comprises stop means operatively coupled to said mounting means which adjustably sets the spacing between the die and the backing roll, wherein said driving movement toward said stop means sets said spacing as determined by said adjustable stop means.

3. The precision positioning means of claim 1 further comprising second means for driving said mounting means and said die away from said backing roll against the force of said drive means, said second driving means being characterized by a high force and short travel to provide a web splice jump capability.

4. The precision positioning system of claims 1, 2, or 3 further comprising means for controlling side loading on said linear slides.

5. The precision mounting system of claim 4 wherein said side loading controlling means comprises a second linear slide mounted on said side plate and a side arm extending between said mounting means and said second linear slide that transmits side loading forces at said linear slide to said second linear slide.

6. The precision positioning system of claim 1 wherein said mounting means includes a pair of upright members each mounted on one of said linear slides.

7. The precision positioning system of claim 6 wherein the die is mounted in said upright members and said mounting is pivotally adjustable about a horizontal axis extending between said uprights.

8. The precision positioning system according to claim 2 wherein said stop means includes a shaft secured in said mounting means and a fixed abutment surface spaced from one end of said shaft.

9. The precision positioning system of claim 8 wherein said shaft is threaded so that its rotation adjusts its longitudinal position with respect to said fixed abutment.

10. The precision positioning system of claim 9 wherein said stop means further comprises a motor and gear means operatively coupled between said motor and said rod threads whereby activation of said motor adjusts said spacing through a rotation of said shaft.

11. The precision positioning system according to claim 1 wherein the die includes an internal gear pump to meter and distribute said coating material.

12. The precision positioning system according to claim 11 further comprising drive means for said gear pump mounted on one of said upright members.

13. The precision positioning system of claim 11 further comprising adjustment means for setting the coating thickness profile across the web.

14. The precision positioning system of claims 1, 10 or 13 further comprising means for continuously sensing the thickness of said coating on said web and generating an output signal proportional to the sensed thickness and means for generating control signals in response to said output signals to adjust said coating thickness.

15. The precision positioning system of claim 14 wherein said control signal controls the operation of said stop means by motor to continuously adjust the web-to-die spacing.

16. The precision positioning system of claim 14 wherein said control signal controls the operation of said adjustment means to control the cross-web profile of the coating automatically.

17. The precision positioning system of claim 16 wherein said adjustment means includes motors secured to each of a set of adjustment screws arrayed across the die.

* * * * *